United States Patent [19]

Schneider

[11] Patent Number: 4,934,680
[45] Date of Patent: Jun. 19, 1990

[54] MANUFACTURING JIG

[75] Inventor: Rudolf Schneider, Reinach, Switzerland

[73] Assignee: Erowa AG, Switzerland

[21] Appl. No.: 239,433

[22] Filed: Sep. 1, 1988

[30] Foreign Application Priority Data

Sep. 4, 1987 [DE] Fed. Rep. of Germany ....... 3729601

[51] Int. Cl.$^5$ .............................................. B23Q 1/06
[52] U.S. Cl. .................................................... 269/309
[58] Field of Search ............... 29/559, 563, 464, 33 P; 33/180 R; 198/345; 269/56, 309, 310, 329, 20, 900; 404/219, 220, 225, 218

[56] References Cited

U.S. PATENT DOCUMENTS

| | | | |
|---|---|---|---|
| 4,275,983 | 6/1981 | Bergman | 269/329 |
| 4,390,172 | 6/1983 | Gotman | 269/309 |
| 4,586,702 | 5/1986 | Chambers | 269/310 |
| 4,693,458 | 9/1987 | Lewecke et al. | 269/329 |
| 4,794,687 | 1/1989 | Peters et al. | 269/900 |

FOREIGN PATENT DOCUMENTS 1008966 5/1957 Fed. Rep. of Germany .
3115586 3/1982 Fed. Rep. of Germany .

Primary Examiner—Robert C. Watson
Attorney, Agent, or Firm—Tarolli, Sundheim & Covell

[57] ABSTRACT

The invention provides a manufacturing jig to precisely position a workpiece with reference to a workpiece receiving means. The jig comprises a workpiece supporting member to which the workpiece is fixed and a receiving member on which said workpiece supporting member is releasably mounted. The receiving member comprises two registering pins protruding from one surface thereof. The workpiece supporting member comprises two centering apertures adapted to engage the two registering pins upon mounting the workpiece supporting member on the receiving member. The two centering apertures are located distantly to each other. The first centering aperture has a fixed position with reference to the workpiece supporting member and the second centering aperture is displaceable with reference to the workpiece supporting member in a direction along a tie line between the centers of the first and second centering apertures, but movable in a direction running perpendicular to said tie line.

18 Claims, 5 Drawing Sheets

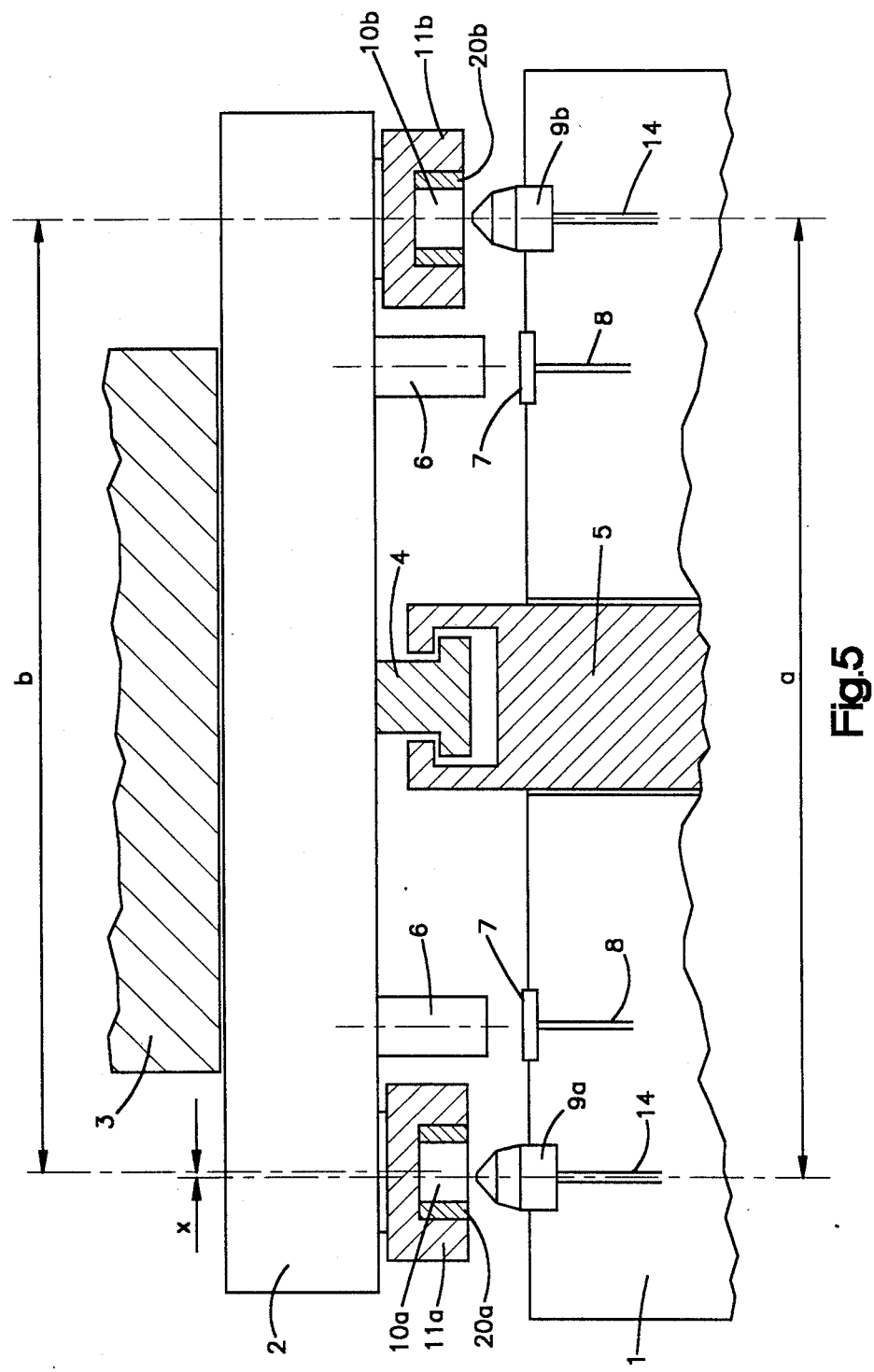

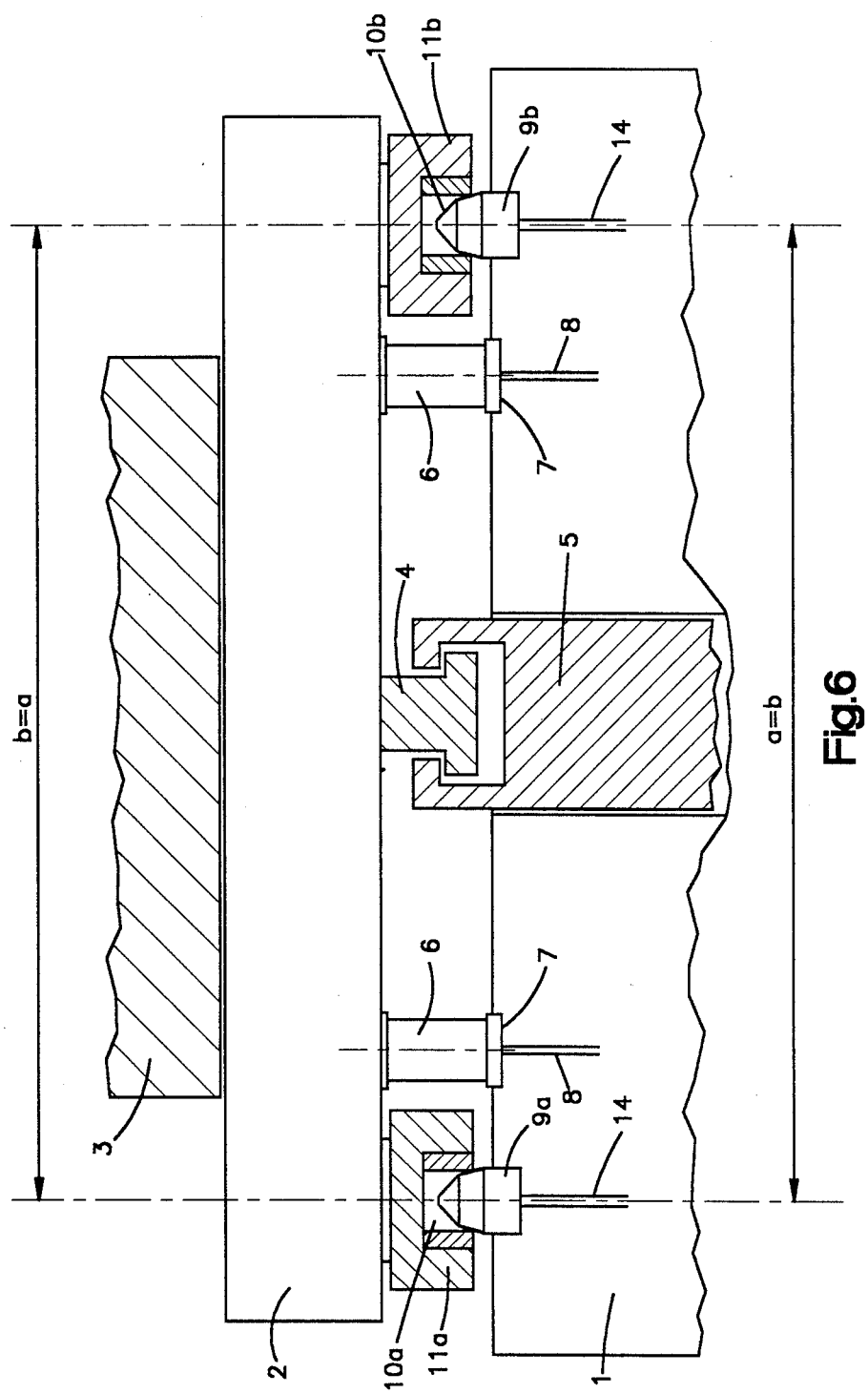

MANUFACTURING JIG

BACKGROUND OF THE INVENTION

1. Field of the Invention

The present invention relates to an assembly for precisely positioning an element, e.g. a workpiece to be machined or a tool used in a machining apparatus, with reference to a reference center or axis of the machining apparatus. More particularly, the invention relates to a manufacturing jig adapted to precisely position a workpiece with reference to a workpiece receiving means, said jig comprising a workpiece supporting member to which the workpiece is fixed and a receiving member on which said workpiece supporting member is releasably mounted.

The expression "precisely positioning" shall express, in its widest sense, that an element, e.g. a workpiece to be machined or a machining tool used for machining a workpiece, is fixed within a machining device in a well defined and exactly known position. Particularly, according to a first aspect of the invention, the element shall be exactly positioned with reference to two directions running perpendicularly to each other in a first plane, e.g. in the vertical plane, with other words, in the X- and Y-directions, as well as with reference to its angular orientation in said first plane. According to a second aspect of the invention, additionally, an exact position with regard to the height of the element shall also be achieved, i.e. along the Z-axis which runs perpendicular to said aforementioned first plane. Such positioning is not so difficult to realize, but nevertheless very important as well.

Prior Art

For the clamping of small workpieces or of tools having usually small dimensions as well, devices are known in the prior art comprising a workpiece or tool support member to which the workpiece or the tool is fixed. The workpiece or tool support member, together with the workpiece or tool, may be mounted on a receiving member which may be part of the machining apparatus or which is mounted within the machining apparatus in a known and well defined position.

In order to define the relative position between support member and receiving member, it is also known in the art to provide the receiving member with protruding registering pins and to provide the supporting member with correspondingly arranged centering apertures whereby the registering pins engage the centering apertures upon mounting of the supporting member on the receiving member. If the position in Z-direction is not considered, it is sufficient to provide two cooperating pin-aperture-pairs. One of the two cooperating pin/aperture-pairs defines the position in X- and Y-direction and the cooperation of the two pin/aperture-pairs defines the angular position around the Z-axis.

It is a fundamental prerequisite for such assemblies of the kind mentioned hereinabove that, on the one hand, the registering pins and, on the other hand, the centering apertures be very precisely located as far as their relative position is concerned. Only if this condition is fulfilled, it is ensured that the registering pins and the centering openings properly cooperate and match such that the supporting member will take the desired position with reference to the receiving member upon mounting the supporting member on the receiving member. The result is that the supporting members and the receiving members have to be manufactured very carefully and with a very high accuracy and, thus, the manufacturing costs will be very high. This problem is particularly serious if extraordinary high demands are made to the positional accuracy, as it is the case e.g. in the field of electroerosive machining of workpieces. Furthermore, it must be noted that an assembly of the kind referred to hereinabove often is geometrically redundant or overdefined, particularly if, as usual, conical registering pins are provided since both pin/aperture-pairs define the X/Y-position independently from each other in this case.

These disadvantages are particularly serious if relatively big workpieces have to be clamped in an exactly defined position.

In order to obtain a stable position, the registering pins and, consequently, the centering apertures are located as far away as possible from each other. Even if the distance between the registering pins and the centering apertures, respectively, is in the region of 20 to 40 cm, a thermal difference between the supporting member and the receiving member causes considerable distance deviations which impair a perfect fit of one of the registering pins in the related centering aperture. The result is that the extremely high positional accuracy which is particularly important in the field of tool manufacturing is no longer ensured.

Another problem consists in the fact that a plurality of different supporting members have to be mounted on the same receiving member. It is possible that the supporting members have been manufactured in different batches and, thus, may have a slightly different size as far as the position of the centering apertures is concerned. Even if these tolerances in the distance between the centering apertures may be quite small, a very exact positioning with reference to the related receiving member will be not possible anymore if very high demands with regard to the precision are made.

The DE 31 15 586 A1 discloses an apparatus for changing and centering pallets of a machine tool. The apparatus comprises a feed conveyor which serves to convey the pallets loaded with workpieces to be machined to a pallet receiving and workpiece machining station. As soon as the pallet has arrived there, the station is lowered until the pallet abuts on the surface of Z-axis centering pins. However, these centering pins do not have any effect on the position of the pallet in X-, Y- or angular direction. Upon lowering of the pallet, conically shaped upper end portions of registering pins engage centering bushings which have a corresponding conical shape. The bushings are resiliently mounted in axial direction, but rigidly mounted in radial direction. It is said that "an exact positioning of the pallet in radial direction" can be achieved, but this seems hardly possible due to the problems of inaccurate manufacturing or thermal expansion or contraction as discussed hereinbefore.

With this design, it is not possible to realize an exact positioning in X- and Y-direction and with regard to the angular position around the Z-axis, particularly, if the distances between the central axes of the registering pins on the one hand and between the bushings on the other hand are not exactly equal. It will be clear to every person skilled in the art that the position of the pallet is not well defined if the distance between the registering pins is not exactly equal to the distance between the centering bushings because, depending on the initial position of the pallet, the one or the other pin/bushing-pair will engage in a positive manner and thus defines the X/Y-position. Consequently, the pallet can take two different positions; but exactly this problem shall be avoided with the present invention.

The publication DE-AS 10 08 966 discloses how a first part of a machine is resiliently connected to and mounted on, respectively, a second part of a machine. The purpose is to position one of said machine parts under the influence of controlled external displacement forces whereby the negative effect of the static friction should be eliminated. As soon as the desired position is achieved, e.g. by manually or mechanically shifting said one machine part, the two machine parts movable relative to one another are clamped together, e.g. by means of an electromagnet. This publication does not treat the problem to positively position two parts with reference to each other and does not give any solution to this problem.

OBJECTS OF THE INVENTION

It is an object of the invention to avoid the disadvantages of the manufacturing jigs of the kind referred to hereinabove and known in the prior art. Particularly, it is an object of the present invention to provide a manufacturing jig of the kind referred to hereinabove which must not be manufactured with utmost precision and nevertheless a very high positional accuracy. It is a still further object of the invention to provide a workpiece supporting member incorporating at least two centering apertures the distance of which has not to be within very close limits. It is a still further object of the invention to provide a receiving member adapted to cooperate with said workpiece supporting member and having at least two registering pins the distance of which has not to be within very close limits. Finally, it is an object of the present invention to provide a manufacturing jig comprising a workpiece supporting member and a receiving member which ensures an exact positioning of the workpiece supporting member with reference to the receiving member even if the two cooperating members have different temperatures.

SUMMARY OF THE INVENTION

Accordingly, the present invention provides a manufacturing jig adapted to precisely position a workpiece with reference to a workpiece receiving means. The jig of the invention comprises a workpiece supporting member to which the workpiece is fixed and a receiving member on which the workpiece supporting member is releasably mounted.

The receiving member comprises at least two registering pins protruding from one surface thereof, and the workpiece supporting member comprises at least two centering apertures adapted to engage said at least two registering pins upon mounting the workpiece supporting member on the receiving member. Further, locking means are provided to fix the workpiece supporting member to the receiving member whereby said at least two centering apertures provided in the workpiece supporting member are located distantly to each other.

In order to realize the desired effect, a first of said at least two centering apertures in the workpiece supporting member has a fixed position with reference to the workpiece supporting member, and a second of said at least two centering apertures is displaceable with reference to the workpiece supporting member in a direction along a tie line between the centers of said first and said second centering apertures or parallel to said tie line, but immovable in a direction running perpendicular to said tie line between the centers of said first and said second centering apertures.

Thus, it is particularly ensured that, in the case of two pin/aperture-pairs, the fixed centering aperture cooperating with one of the registering pins defines the position of the workpiece supporting member in X- and Y-direction and thereby the Z-axis, while the second, displaceable centering aperture cooperating with the other registering pin positions the workpiece supporting member with regard to its angular position around the Z-axis. In this way, the real distance between the two registering pins and the two centering apertures, respectively, is of no more importance because one of the centering apertures is movable towards and away from the other centering aperture. Consequently, tolerances in manufacturing, thermal dimension changes etc. are compensated and no geometrical redundancy or overdefinition can occur.

Even if any suitable kind of displaceable arrangement of the movable centering aperture in the workpiece supporting member is possible, a design has proved advantageous in which the workpiece supporting member comprises a base portion and a movable portion, said movable portion being resiliently connected to said base portion, and in which the first fixed centering aperture is provided in the base portion of the workpiece supporting member and the second displaceable centering aperture is provided in the movable portion of the workpiece supporting member. This design can be realized without any difficulty because, in practice, the actual path of displacement of the movable centering opening is in the region of a few 1/100 to not more than 1/10 millimetres.

An advantageous solution to realize a displacement of the centering aperture in one direction and a rigidity in perpendicular direction is a design in which the movable portion of the workpiece supporting member is connected to the base portion of the workpiece supporting member by means of leaf spring-like elements. Such elements show a very favourable behaviour within the small pathes of movement, i.e. a ideally linear bending behaviour and a great strength in the direction of their extension. Furthermore, it must be noted that these elements are subjected to only very small forces and only during positioning of the workpiece supporting member on the receiving member since they have to provide only for the resilient guiding of the movable part of the workpiece supporting member while the comparatively high clamping forces act on the base part of the workpiece supporting member.

In order to make use of the aforementioned advantageous attributes of such leaf spring-like elements in the best way, a design should be used in which the leaf spring-like elements extend in a direction perpendicular to the tie line between said displaceable centering aperture and a further centering aperture provided in the base portion of the workpiece supporting element.

Even if there may be provided separate leaf spring elements connecting the movable part of the workpiece supporting member to the base part thereof, it seems to be advantageous if the leaf spring-like elements are constituted by material lands integrally formed with the movable portion of the workpiece supporting element as well as with the base portion of the workpiece supporting element. For instance, this can be realized by cutting a number of narrow slits into the workpiece supporting member or into an auxiliary element connected thereto, e.g. by wire erosion, in order to cinematically separate the movable part from the base part of the workpiece supporting element.

As already mentioned, a particularly advantageous solution to meet the objects of the invention may be seen in a design in which the workpiece supporting member comprises a first fixed centering aperture cooperating with a first registering pin provided on the receiving member and a second displaceable centering aperture cooperating with a second registering pin provided on the receiving member. The first pin/aperture-pair serves as the X/Y-reference, i.e. the Z-axis, for the machining of a workpiece, and the second pin/aperture-pair defines the angular position of the workpiece supporting member around the Z-axis.

Basically, it is possible to design the workpiece supporting member in two parts, including a first base part comprising the fixed centering aperture and a second movable part comprising the displaceable centering aperture; however a design appears more advantageous in which the workpiece supporting member comprises a first centering crossbeam and a second centering crossbeam, said first centering aperture being provided in said first centering crossbeam and said second centering opening being provided in said second centering crossbeam.

The first and second centering crossbeams are located distantly from each other and are connected to the workpiece supporting member with a certain distance to the bottom surface thereof. They comprise two end portions rigidly connected to the workpiece supporting member and an intermediate portion interconnecting said two end portions. The first and second centering apertures, respectively, are provided in said intermediate portions of the first and second centering crossbeams, respectively. The intermediate portions of the first and second centering crossbeams are resiliently displaceable towards and away from the workpiece supporting member, i.e. in Z-direction, and the intermediate portion of the second centering crossbeam, additionally, is resiliently displaceable towards the intermediate portion of the first centering crossbeam and away therefrom.

Thus, the person skilled in the art has much more freedom in designing the real workpiece support since it can use the same crossbeams with different kinds of workpiece supporting plates.

The centering pins of the receiving member are made of hard alloy metal and comprise a first conical surface portion having a substantially small conicity serving for the actual centering operation as well as an adjacent second conical end surface portion having a substantially stronger conicity supporting the inserting of the registering pin into the related centering aperture.

By the characteristic that the registering pins comprise a central continuous bore connected to a source of pressurized air, a very effective cleaning effect can be realized. During the insertion of the registering pin into the centering aperture, pressurized air escapes from the registering pin and removes any dirt or contamination. This is particularly effective if the centering apertures are constituted by hard alloy metal bushing members which are open at least at one end thereof, said bushing members being inserted into the rigid central parts of the centering crossbeams.

A particularly effective and precise positioning may be achieved in connection with the above mentioned registering pins if an edge portion of the interior wall of the hard alloy metal bushing members facing the registering pins are conically enlarged, whereby the conicity of the enlarged edge portion of the hard alloy metal bushing members is greater than the conicity of said first surface portion of the registering pins having a substantially small conicity. Thus, an essentially annular line contact results between registering pin and centering bushing without the danger of jamming, and the cleaning effect is further improved, additionally to the effect due to the blowing-in of the pressurized air, because dirt particles are scraped off.

BRIEF DESCRIPTION OF THE DRAWINGS

In the following, an embodiment of the assembly of the invention will be further described, with reference to the accompanying drawings, in which:

FIG. 5 shows a schematic, partly sectioned side view of the manufacturing jig according to the invention in a released condition; and FIG. 6 shows a schematic, partly sectioned side view of the manufacturing jig according to the invention in a clamped condition.

DETAILED DESCRIPTION OF A PREFERRED EMBODIMENT

Figure 1:
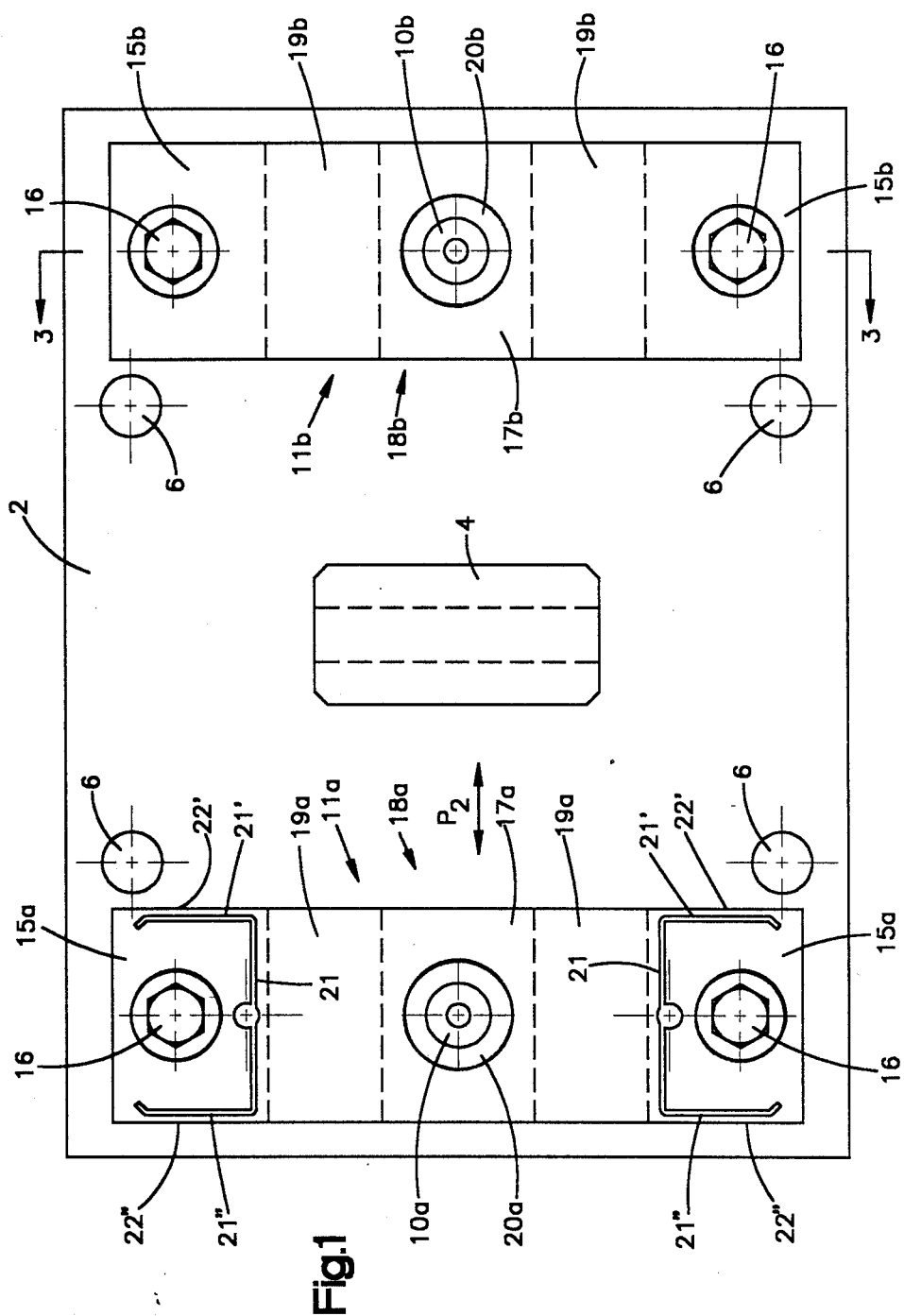
FIG. 1 shows a bottom view of a workpiece support member of the manufacturing jig according to the invention.

The embodiment to be further described hereafter is a manufacturing jig adapted to receive a workpiece which has to be exactly positioned within a machining apparatus with regard to the X/Y-directions, with regard to its angular orientation around the Z-axis as well as with regard to its location along the Z-axis. However, it is understood that the basic principle of the invention may be used for fixing and positioning a machining tool if the jig is constructively adapted in a suitable manner which should be obvious to any person skilled in the art.

The general layout of the manufacturing jig according to the invention may be best seen in FIGS. 5 and 6. Thus, the manufacturing jig comprises a receiving member 1. The receiving member 1 can be constituted by the worktable of the machining device (the latter one not shown in the drawings), or it can be constituted by a separate receiving member rigidly connected to the working table of the machining device. Furthermore, a workpiece supporting member 2 is provided. In the example shown in the drawings, the workpiece supporting member 2 is of flat, plate-like structure and can be equipped with (not shown) bores, grooves, clamping means and the like in order to fixedly support a workpiece 3 to be machined by the machining device. It is also possible, in certain particular cases, that the workpiece supporting member 2 be constituted by the workpiece 3 itself, i.e., no separate workpiece supporting member is necessary.

A fixing means is provided to mount the workpiece supporting member 2 on the receiving member 1. In the present example, the fixing means comprises a schematically shown fixing bar 4 having inverse T-shape an being connected to the bottom side of the workpiece supporting member 2, thereby protruding from the bottom surface thereof with its leg extending parallel to the supporting member 2. The fixing means further comprises an anchoring piston 5, the upper portion thereof being shaped correspondingly to the shape of the fixing bar 4 and engaging the latter one with clearance. Thus, the desired centering effect of the workpiece supporting member 2 with regard to the receiving member 1 is not impaired. By moving the anchoring piston 5 downward, the entire workpiece supporting member 2 is drawn towards the receiving member 1 and lockingly fixed as will be further explained hereinafter.

The height position of the workpiece supporting member 2 with regard to the receiving member 1 and, thereby, the positioning in Z-direction is determined by, according to the example shown in the drawings, four supporting pins 6 connected, with one end thereof, to the workpiece supporting member 2 and abuting, with their other end, against supporting surfaces 7 provided on the surface of the receiving member 1. However, it is understood by any person skilled in the art that also three supporting pins 7 would be sufficient to provide a definite position of the workpiece supporting member 2 with regard to the receiving member in Z-direction.

The receiving member 1 is provided with air channels 8 connected to a supply of pressurized air; the channels 8 merge into the supporting surface 7. The purpose of these air channels 8 is, on the one hand, to blow away any dirt or contamination which could be present on the surface of the supporting surfaces 7. Such blow-away action is most efficient as soon as the supporting pins 6 approach the supporting surfaces 7 since, in this moment, only a small space is left between the surface of the supporting surfaces 7 and the surface of the supporting pins 6 with the result that the speed of the air leaving from the air channels 8 is greatly accelerated. On the other hand, the outlet of the air channels 8 is closed as soon as the supporting pins 6 abut against the supporting surfaces 7; thus, the pressure in the air channels 8 increases and this increase in pressure can be monitored and used to get a signal indicating whether a workpiece supporting member 2 is properly seated on the receiving member 1 or not.

In order to provide a positioning of the workpiece supporting member 2 with regard to the receiving member 1 in X-, Y- and angular direction, the latter one is provided with two registering pins 9a and 9b rigidly inserted into the top surface of the receiving member 1 and protruding therefrom with their conical end portions. The exact design of the registering pins 9a and 9b will be fully described hereinafter.

The registering pins 9a and 9b cooperate with centering apertures 10a and 10b provided, basically, on the workpiece receiving member 2 and, more exactly, on two centering crossbeams 11a and 11b connected to the bottom surface of the workpiece receiving member 2 and having a certain distance to the bottom surface thereof. Again, the structure and design of the centering crossbeam 11a and 11b will be further explained hereinafter.

The registering pins 9a and 9b comprise each a central continuous bore 12 (cf. FIG. 4) connected to pressurized air channels 14 provided in the receiving member 1 and serving also to the purpose of removing dirt and waste upon inserting the registering pins 9a and 9b into the related apertures 10a and 10b, respectively.

Figure 2:
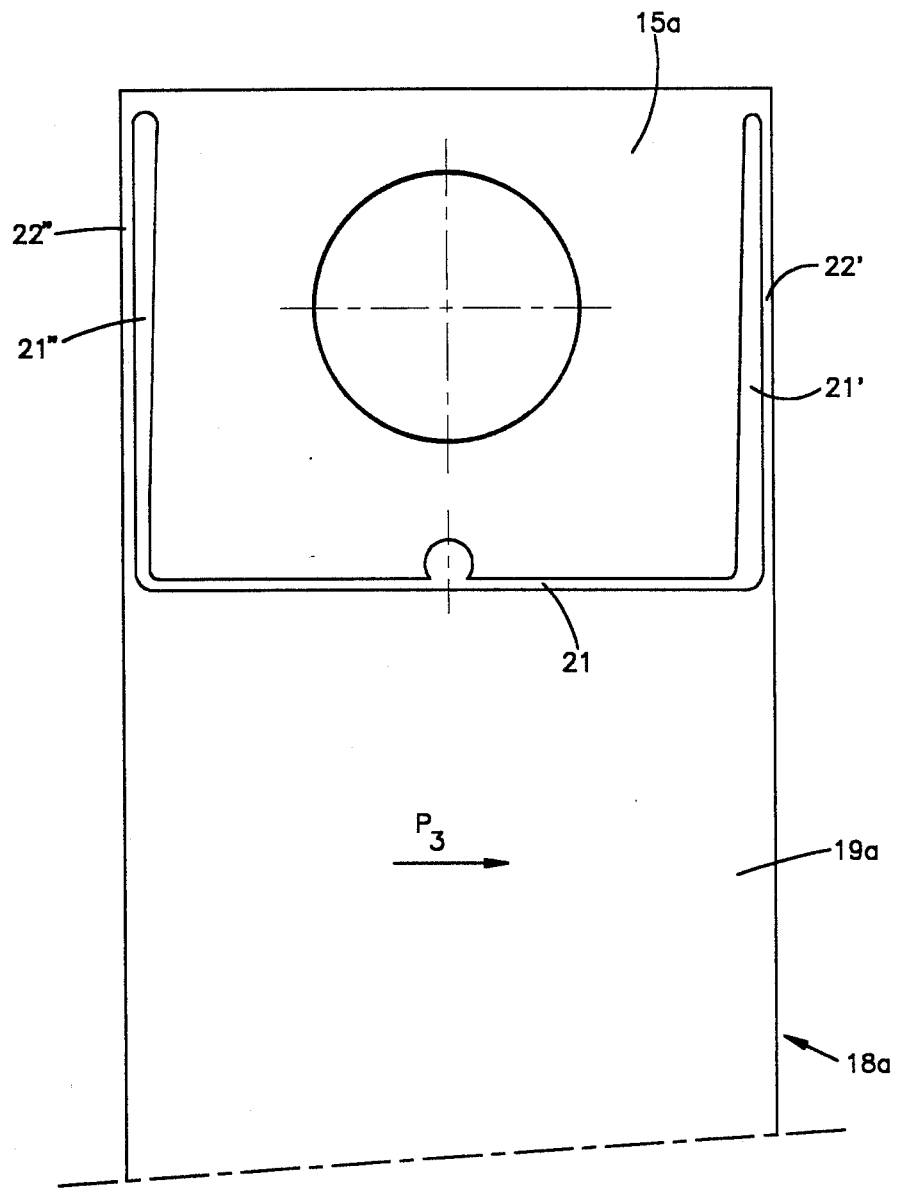
FIG. 2 a schematic detailed view of a part of a centering crossbeam in a larger scale whereby two portions thereof are offset with regard to each other.
Figure 3:
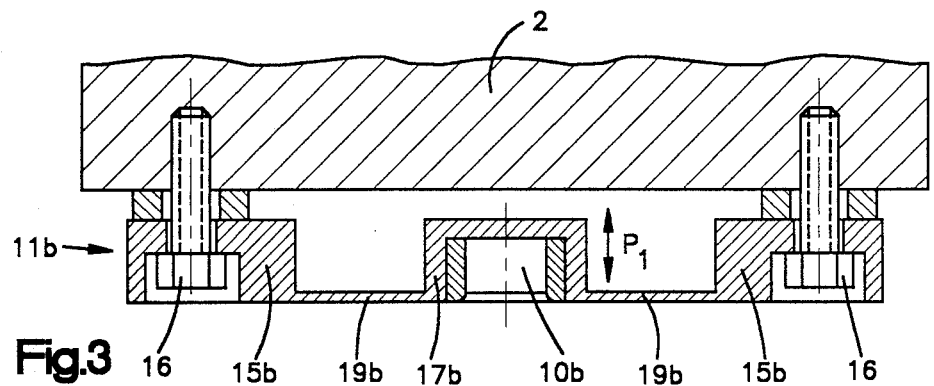
FIG. 3 shows a sectional view along the line III—III in FIG. 1.

The design and structure of the centering crossbeams 11a and 11b may be seen from FIGS. 1 to 3 and will be further described now with reference to these drawing figures. Each of the two centering crossbeams 11a and 11b is of generally elongate shape and connected to the bottom surface of the workpiece supporting member 2. For this purpose, each of the centering crossbeam 11a and 11b comprises on its both ends and end portion 15a and 15b, respectively, fixed to the workpiece supporting member 2 by means of screws 16.

As can be clearly seen from FIGS. 1 and 3, each of the centering crossbeam 11a and 11b comprises and intermediate portion, generally designated by reference numerals 18a and 18b, respectively, and constituted by central parts 17a and 17b, respectively, as well as, in each crossbeam 11a and 11b, adjacent bridging portions 19a and 19b, respectively, and the already mentioned end portions 15a and 15b, respectively. It can readily be recognized from FIG. 3 that the bridging portions 19b have a very small thickness; of course, the same is true for the corresponding bridging portions 19a of the centering crossbeam 11a.

The central part 17b of the centering crossbeam 11b (and, correspondingly, the central part 17a of the crossbeam 11a) as well as the end portions 15a and 15b have an increased thickness. Thus, the central parts 17a and 17b as well as the end portions 15a and 15b are rigid while the behaviour of the bridging portions 19a and 19b is like a leaf spring. Consequently, the end portions 15a and 15b, respectively, being rigidly connected to the workpiece supporting member 2 by the screws 16, the central parts 17a and 17b, respectively, are resiliently displaceable in Z-direction towards and away from the workpiece supporting member 2, as indicated by the double-arrow $P_1$ in FIG. 3. On the other hand, the central part 17b of the centering crossbeam 11b is rigidly and immovably fixed to the workpiece supporting member 2 as far as the X- and Y-directions and the angular movement around the Z-axis are concerned.

The centering apertures 10a and 10b, respectively, are in the intermediate portions 18a and 18b, respectively, and comprise a bushing member 20a and 20b, respectively, made of hard alloy inserted into corresponding openings provided in the intermediate portions 18a and 18b, respectively. The particular design of the bushing members 20a and 20b will be explained hereinafter in detail in connection with FIG. 4.

As already mentioned is essentially rigid with regard to the workpiece supporting member 2, with the exception of its intermediate portion 18b which is resiliently displaceable towards and away from the supporting member 2 in the direction of the Z-axis. The situation with regard to the centering crossbeam 11a, however, is different:

1. In a similar manner, the intermediate portion 18a is resiliently displaceable towards and away from the workpiece supporting member 2 as explained in connection with the centering crossbeam 11b.
2. Furthermore, the intermediate portion 18a including the associated bridging portions 19a are further displaceable in the direction of the double-arrow $P_2$ in FIG. 1, i.e. in a direction coincident with the line running through the centres of the centering apertures 10a and 10b. A displacement in a direction running perpendicularly thereto, however, is not possible.

According to the exemplary embodiment shown in the drawings, this behaviour can be achieved as follows:

Both end portions 15a of the centering crossbeam 11a are provided with an essentially U-shaped continuous slot consisting of the legs 21, 21' and 21". The two legs 21' and 21" run near to the side edges of the end portions 15a while the leg 21 connecting said two legs 21' and 21" runs near to and along the boundary between the end portions 15a and the bridging portions 19a of the intermediate portion 18a. Thus, with regard to each end portion 15a, two leaf spring-like elements 22' and 22" are realized which run perpendicular to the direction of displacement of the intermediate portion 18a, i.e. perpendicular to the arrow $P_2$ and which connect the end portions 15a to the intermediate portion 18a, particularly to its bridging portions 19a.

In the present example, the above mentioned leaf spring-like elements 22' and 22" are constituted by material lands between the legs 21' and 21", respectively, and the edges of the end portions 15a. Due to their design, they are very rigid in longitudinal direction, but very flexible in a direction perpendicular to their length extension. In this connection, it must be noted that the amplitudes of movement required in this particular case are very small, e.g. in the region of between a few 1/100 to 1/10 millimetres.

Referring now to FIG. 2, there is shown a part of the centering crossbeam 11a in a larger scale in the situation when its intermediate portion 18a is fully displaced in the direction of arrow $P_3$; it is understood that the view is exaggerated for clarity. As already mentioned, in practice, the usually occurring amplitudes are only minimal. As can be seen from the drawing, the leg 21" has fully closed at its end adjacent to the leg 21 and the lower end of the leaf spring-like element 22" abuts on the end portion 15a while the leg 21' is correspondingly opened at its end adjacent to the leg 21. It is understood that the situation is the same at the other end of the centering crossbeam 11a, of course symmetrical to its center, such that a parallel displacement of the intermediate portion 18a in the direction of the arrow $P_3$ results. However, a displacement of the intermediate portion in a perpendicularly running direction is not possible because the leaf spring-like elements 22' and 22" are sufficiently rigid to prevent such displacement.

If the force urging the intermediate portion 18a in the direction indicated by the arrow $P_3$ ceases to work, the intermediate portion 18a returns automatically to its rest position which is shown in FIG. 1 because the material lands 22' and 22" have a spring-like behaviour.

Figure 4:
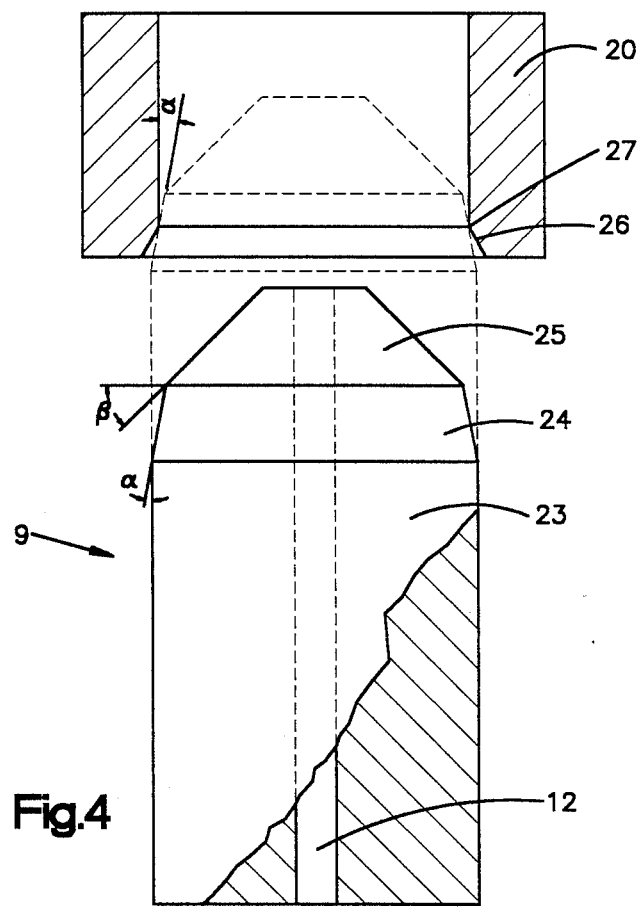
FIG. 4 shows a greatly enlarged, partly sectioned view of a registering bushing and of a registering pin.

Referring now to FIG. 4, the design and the cooperation of the registering pins 9 and of the bushing members 20 will be explained in more detail. Preferably, the registering pins are made of hard alloy metal and comprise a basic body member 23 as well as two surface portions 24 and 25 located at the end of the basic body member and having generally conical shape. The first conical end portion 24 which fulfills the actual centering function has a relatively small conicity, e.g. with an angle $\alpha$ of about 8° while the second portion 25 located near the end surface of the registering pin 9 and which supports the introduction of the registering pin 9 into the related bushing member 20 has a more pronounced conicity, e.g. with an angle $\beta$ of about 45°. As already mentioned, the registering pins 9 comprise a central bore 12 serving to supply pressurized air to the frontal surface thereof.

The centering bushing 20 comprises an edge portion 26 which is conically enlarged. The cone angle $\gamma$ is about 15° but in any event greater than the angle $\alpha$ of the first conical end portion 24 of the registering pin 9. The diameters of the registering pin 9 and the centering bushing 20, respectively, are designed such that the conical surface portion 24 of the pin 9 contacts the edge 27 which constitutes the boundary between the conically enlarged edge portion 26 of the bushing 20 and the cylindrical interior thereof upon insertion of the pin 9 into the bushing 20.

Because the bushings 20a and 20b, respectively inserted into the intermediate portions 18a and 18b, respectively, of the centering crossbeams 11a and 11b, respectively, are closed at one end (cf. FIG. 4), an annular gap is created upon insertion of the pin 9 into the bushing 20 the size of which continuously decreases. Thus, the pressurized air escaping from the mouth of the continuous bore 12 continuously increases its velocity of flow through said annular gap and thereby removes any dirt and contaminations which could be present at the said edge 27 and/or at said conical surface portion 24 of the registering pin 9.

In FIG. 5, the situation is shown where the fixing bar 4 of the workpiece supporting member 2 already has engaged the anchoring piston 5, shortly prior to pulling the workpiece supporting member down against the receiving member 1. Thereby, the distance a between the centres of the two registering pins 9a and 9b does not correspond to the distance b between the centres of the two centering apertures 10a and 10b, e.g. because of tolerances due to careless manufacturing or due to a temperature difference between workpiece supporting member 2 and receiving member 1. Thus, a difference x of distance is present which is, however, very small in practice and which is shown in the drawing of FIG. 5 very exaggerated for clarity.

Now, if the workpiece supporting member 2 is lowered from the position shown in FIG. 5 into the position shown in FIG. 6, the said distance difference x must be compensated. This is accomplished as follows: The one centering crossbeam, namely the rigid crossbeam 11b, and thereby the workpiece supporting member 2 will be set to an exactly defined X/Y-position under the influence of the registering pin 9b entering the centering bushing 20b. Thus, the Z-axis, i.e. the intersection of the X- and Y-axes is fixed and will serve as the reference axis of the machining apparatus. With regard to the other centering crossbeam, however, the situation is different: The intermediate portion 18a will move by an amount x along the line between the centres of the two centering apertures 10a and 10b, as previously explained, until the registering pin 9a is exactly centered with regard to the centering bushing 20a. Simultaneously, as the centering crossbeam 11a is rigid in a direction perpendicular to the displacement direction of its intermediate portion 18a, the entire workpiece supporting member will pivot around the aforementioned Z-axis, i.e. the around the center of the registering pin 9b to such an extent until the desired angular position of the workpiece supporting member 2 and thereby of the workpiece 3 is achieved. Finally, the position shown in FIG. 6 is reached; it must be noted that the supporting pins 6 rest on the supporting surfaces 7 with the result that also a positioning with regard to the height, i.e. in Z-direction, is realized.

During the centering operation as hereinbefore described, the intermediate portions 18a and 18b, respectively, of the two centering crossbeams 11a and 11b, respectively, are resiliently deformed towards the workpiece supporting member 2, i.e. in the direction of the Z-axis. However, this deformation does not have any influence on the accuracy of the position but improves the positive engagement between the conical surface portion 24 of the registering pin 9 and the edge 27 of the bushing 20. In order to provide that the aforementioned resilient displacement of the intermediate portions 18a and 18b, respectively, of the centering crossbeams 11a and 11b, respectively, can take place, the two crossbeams 11a and 11b are fixed to the bottom surface of the workpiece supporting member 2 with a certain distance as can be clearly seen in FIG. 2. It is understood, however, that the bottom surface of the workpiece supporting member 2 could be provided with suitable recesses to achieve the same purpose.

What I claim is:

1. A manufacturing jig for positioning a workpiece, said jig comprising:
   a workpiece supporting member for fixedly supporting the workpiece;
   a receiving member on which said workpiece supporting member is releasably mounted, said receiving member including at least two registering pins protruding from one surface thereof;
   locking means for releasably mounting said workpiece supporting member to said receiving member;
   said workpiece supporting member having at least two centering apertures for receiving said at least two registering pins upon mounting said workpiece supporting member on said receiving member, said at least two centering apertures being located distantly to each other, a first of said at least two centering apertures in the workpiece supporting member having a fixed position with reference to said workpiece supporting member, a second of said at least two centering apertures being displaceable with reference to said workpiece supporting member in a direction along a tie line between the centers of said first and said second centering apertures or parallel to said tie line and being immovable in a direction running perpendicular to said tie line between the centers of said first and said second centering apertures; and
   said workpiece supporting member including a base portion and a movable portion, said movable portion being resiliently connected to said base portion, said first fixed centering aperture being provided in said base portion of said workpiece supporting member and said second displaceable centering aperture being provided in said movable portion of said workpiece supporting member.

2. A manufacturing jig according to claim 1 in which said movable portion of said workpiece supporting member is connected to said base portion of said workpiece supporting member by means of leaf spring-like elements.

3. A manufacturing jig according to claim 2 in which said leaf spring-like elements extend in a direction perpendicular to the tie line between said displaceable centering aperture and a further centering aperture provided in said base portion of said workpiece supporting element.

4. A manufacturing jig according to claim 3 in which said leaf spring-like elements are constituted by material lands integrally formed with said movable portion of said workpiece supporting element as well as with said base portion of said workpiece supporting element.

5. A manufacturing jig for positioning a workpiece, said jig comprising:
   a workpiece supporting member for fixedly supporting the workpiece;
   a receiving member on which said workpiece supporting member is releasably mounted, said receiving member including at least two registering pins protruding from one surface thereof;
   locking means for releasably mounting said workpiece supporting member to said receiving member; and
   said workpiece supporting member having at least two centering apertures for receiving said at least two registering pins upon mounting said workpiece supporting member on said receiving member, said at least two centering apertures being located distantly to each other, a first of said at least two centering apertures in the workpiece supporting member having a fixed position with reference to said workpiece supporting member, a second of said at least two centering apertures being displaceable with reference to said workpiece supporting member in a direction along a tie line between the centers of said first and said second centering apertures or parallel to said tie line and being immovable in a direction running perpendicular to said tie line between the centers of said first and said second centering apertures.

6. A manufacturing jig according to claim 1 in which said workpiece supporting member comprises a first fixed centering aperture cooperating with a first registering pin provided on said receiving member and a second displaceable centering aperture cooperating with a second registering pin provided on said receiving member.

7. A manufacturing jig for positioning a workpiece, said jig comprising:
   a workpiece supporting member for fixedly supporting the workpiece;
   a receiving member on which said workpiece supporting member is releasably mounted, said receiving member including at least two registering pins protruding from one surface thereof;
   locking means for releasably mounting said workpiece supporting member to said receiving member;
   said workpiece supporting member having at least two centering apertures for receiviing said at least two registering pins upon mounting said workpiece supporting member on said receiving member, said at least two centering apertures being located distantly to each other, a first of said at least two centering apertures in the workpiece supporting member having a fixed position with reference to said workpiece supporting member, a second of said at least two centering apertures being displaceable with reference to said workpiece supporting member in a direction along a tie line between the centers of said first and said second centering apertures or parallel to said tie line and being immovable in a direction running perpendicular to said tie line between the centers of said first and said second centering apertures; and
   said workpiece supporting member including a first centering crossbeam and a second centering crossbeam, said first centering aperture being provided in said first centering crossbeam and said second centering opening being provided in said second centering crossbeam.

8. A manufacturing jig according to claim 7 in which said first and second centering crossbeams are located distantly from each other and each connected to the workpiece supporting member with a certain distance to the bottom surface thereof.

9. A manufacturing jig according to claim 8 in which said first and second centering crossbeams comprise two end portions rigidly connected to said workpiece supporting member and an intermediate portion interconnecting said two end portions.

10. A manufacturing jig according to claim 9 in which said first and second centering apertures, respectively, are provided in said intermediate portions of said first and second centering crossbeam, respectively.

11. A manufacturing jig according to claim 10 in which said intermediate portions of said first and second centering crossbeams are resiliently displaceable towards and away from the workpiece supporting member.

12. A manufacturing jig according to claim 10 in which said intermediate portion of said second centering crossbeam is resiliently displaceable towards said intermediate portion of said first centering crosssbeam and away therefrom.

13. A manufacturing jig according to claim 10 in which said first and second intermediate portions of said first and second centering crossbeams each comprise a rigid central part and two substantially thinner bridging portions connecting said central part to said end portions, said centering apertures being provided in said rigid central part.

14. A manufacturing jig according to claim 13 in which said centering apertures are constituted by hard alloy metal bushing members which are open at least at one end thereof, said bushing members being inserted into said rigid central parts of said centering crossbeams.

15. A manufacturing jig according to claim 14 in which an edge portion of the interior wall of said hard alloy metal bushing members facing said registering pins are conically enlarged, and in which the conicity of the enlarged edge portion of said hard alloy metal bushing members is greater than the conicity of said first surface portion of said registering pins having a substantially small conicity.

16. A manufacturing jig for positioning a workpiece, said jig comprising:
a workpiece supporting member for fixedly supporting the workpiece;
a receiving member on which said workpiece supporting member is releasably mounted, said receiving member including at least two registering pins protruding from one surface thereof;
locking means for releasably mounting said workpiece supporting member to said receiving member;
said workpiece supporting member having at least two centering apertures for receiving said at least two registering pins upon mounting said workpiece supporting member on said receiving member, said at least two centering apertures being located distantly to each other, a first of said at least two centering apertures in the workpiece supporting member having a fixed position with reference to said workpiece supporting member, a second of said at least two centering apertures being displaceable with reference to said workpiece supporting member in a direction along a tie line between the centers of said first and said second centering apertures or parallel to said tie line and being immovable in a direction running perpendicular to said tie line between the centers of said first and said second centering apertures; and
said centering pins of said receiving member being made of hard alloy metal and including a first conical surface portion having a substantially small conicity as well as an adjacent second conical end surface portion having a substantially stronger conicity.

17. A manufacturing jig for positioning a workpiece, said jig comprising:
a workpiece supporting member for fixedly supporting the workpiece;
a receiving member on which said workpiece supporting member is releasably mounted, said receiving member including at least two registering pins protruding from one surface thereof;
locking means for releasably mounting said workpiece supporting member to said receiving member;
said workpiece supporting member having at least two centering apertures for receiving said at least two registering pins upon mounting said workpiece supporting member on said receiving member, said at least two centering apertures being located distantly to each other, a first of said at least two centering apertures in the workpiece supporting member having a fixed position with reference to said workpiece supporting member, a second of said at least two centering apertures being displaceable with reference to said workpiece supporting member in a direction along a tie line between the centers of said first and said second centering apertures or parallel to said tie line and being immovable in a direction running perpendicular to said tie line between the centers of said first and said second centering apertures; and
said registering pins having a central continuous bore connected to a source of pressurized air.

18. A manufacturing jig for a workpiece, said jig comprising:
a supporting member for fixedly supporting the workpiece;
a receiving member on which said supporting member is releasably mounted, said receiving member including first and second registering pins spaced apart from each other and protruding from a surface of said receiving member;
means for releasably mounting said supporting member on said receiving member; and
said supporting member including a first part having a first centering aperture and a second part having a second centering aperture, the first and second centering apertures spaced being apart from one other and being provided for receiving said first and second registering pins, respectively, said first part having the first centering aperture being in a fixed position relative to said supporting member, said second part having the second centering aperture being displaceable relative to said supporting member in a direction along a first line extending between the centers of the first and second centering apertures or extending parallel to the centers of the first and second centering apertures and being fixed against movement in a direction along a second line extending transverse to said first line, said second part having the second aperture being displaced relative to said supporting member in a direction along said first line when said second registering pin is positioned in the second aperture of said second part to mount said supporting member on said receiving member.

* * * * *

UNITED STATES PATENT AND TRADEMARK OFFICE
CERTIFICATE OF CORRECTION

PATENT NO. : 4,934,680
DATED : June 19, 1990
INVENTOR(S) : Rudolf Schneider

It is certified that error appears in the above-identified patent and that said Letters Patent is hereby corrected as shown below:

Column 12, Line 30, Claim 6, change "1" to --5--.

Column 12, Line 49, Claim 7, change "receiviing" to --receiving--.

Column 13, Line 25, Claim 12, change "crosssbeam" to --crossbeam--.

Signed and Sealed this

Twenty-fourth Day of September, 1991

Attest:

HARRY F. MANBECK, JR.

Attesting Officer

Commissioner of Patents and Trademarks